United States Patent [19]

Roe

[11] 4,289,337
[45] Sep. 15, 1981

[54] TUBING CONNECTION FOR CONTAINERS GENERALLY UTILIZING DISSIMILAR MATERIALS

[75] Inventor: Frank L. Roe, Ingleside, Ill.

[73] Assignee: Baxter Travenol Laboratories, Inc., Deerfield, Ill.

[21] Appl. No.: 41,838

[22] Filed: May 23, 1979

[51] Int. Cl.³ .............................................. F16L 3/04
[52] U.S. Cl. .................................. 285/158; 285/200; 285/331; 285/423; 285/DIG. 16; 128/214 D; 29/400 C
[58] Field of Search ............... 285/331, 332, 423, 260, 285/200, DIG. 16, 158; 128/214 D; 29/400 C

[56] References Cited

U.S. PATENT DOCUMENTS

| | | | |
|---|---|---|---|
| 4,002,358 | 1/1977 | Streit | 285/423 X |
| 4,049,034 | 9/1977 | Vcelka et al. | 285/423 X |
| 4,076,285 | 2/1978 | Martinez | 285/332 |
| 4,162,092 | 7/1979 | Hoyes | 285/423 |

FOREIGN PATENT DOCUMENTS 1142955 4/1957 France ................................ 285/423

Primary Examiner—Dave W. Arola
Attorney, Agent, or Firm—Paul C. Flattery; John P. Kirby, Jr.; Garrettson Ellis

[57] ABSTRACT

A connection between a tubing and a container, for example a blood bag and donor tubing, may be made even if dissimilar materials are utilized which are incompatible for heat sealing together. A pair of inner and outer tapered, telescoping sleeve members retain between them a flexible tubing segment. The sleeve members carry a flange which is of a material adapted for sealing to said container. The tubing segment defines a different material which is less sealingly compatible with said container, and is adapted to be sealed at its outer end to the telescopically connected tubing which may comprise the donor tube of a blood bag or the like.

1 Claim, 4 Drawing Figures

U.S. Patent  Sep. 15, 1981  4,289,337
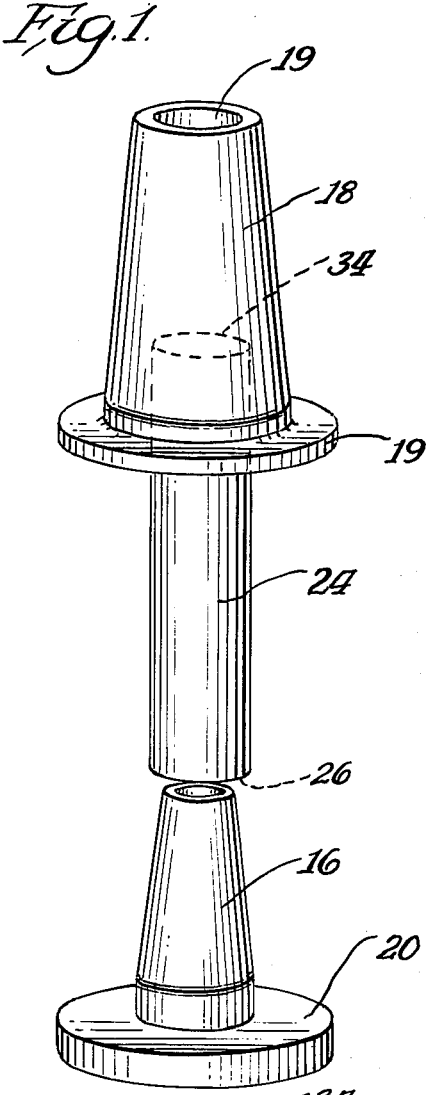
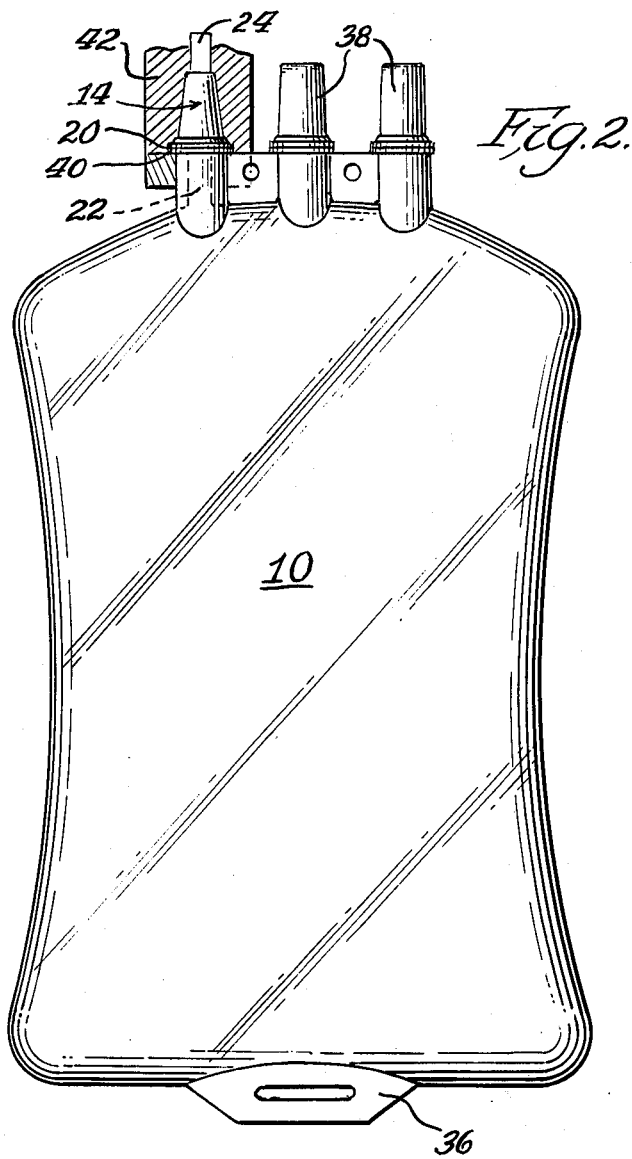
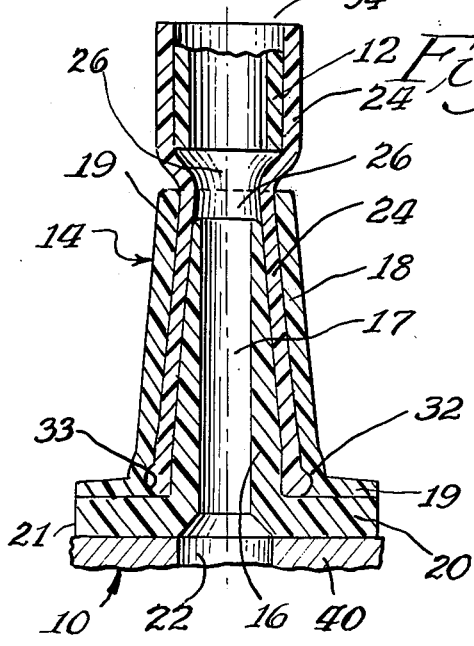
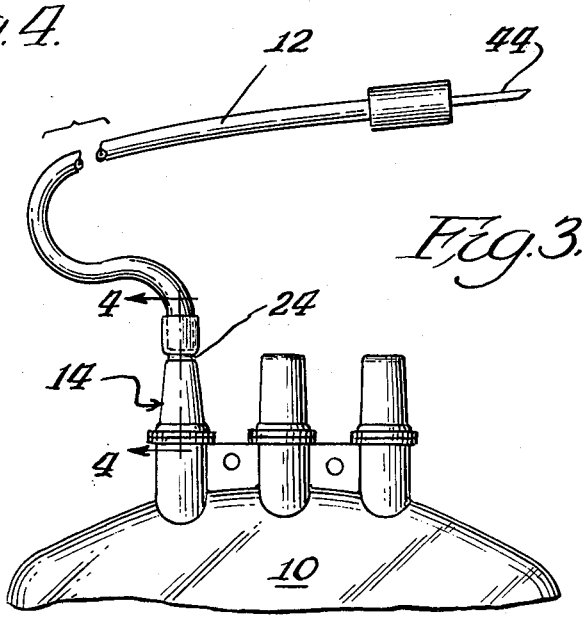

TUBING CONNECTION FOR CONTAINERS GENERALLY UTILIZING DISSIMILAR MATERIALS

BACKGROUND OF THE INVENTION

Present currently available blood bags comprise polyvinyl chloride collapsible containers, to which is sealed a donor tubing which is also made of a polyvinyl chloridebased formulation.

Currently, development work has taken place on blood bags which are not made of a polyvinyl chloride based formulation. For example, it has been taught in the prior art that blood bags made be made of polyolefin, polyurethane, or the like. For example, with polyolefin formulations, such as materials which are substantially made of propylene units, it may be desirable to make the tubing which is connected to the flexible container out of a dissimilar material, for example, a polyvinyl chloride formulation.

A problem arises with such structures in that the differing formulations of the container and the connected tubing may result in difficulties in sealing of the tubing to the container. For example, a blood bag may be mde in accordance with the teachings of U.S. Pat. No. 4,140,162. but it may be desirable for the donor tubing connected to the blood bag to be made of a polyvinyl chloride formulation.

In Vcelka and Winchell U.S. Pat. No. 4,049,034, a connection means has been proposed in which direct sealing between the bag material and the tubing material is avoided. However in this particular patent a latex sleeve is used, which may be deemed undesirable due to expense.

In this invention, a connector between a blood bag and donor tubing is provided, having a substantial potential for cost saving manufacturing, and reliably providing a firm, sealed connection between a container such as a blood bag and flexible tubing, even when the container and tubing are incompatible from the viewpoint of sealing, with a simple and highly inexpensive design which is easy to asemble.

DESCRIPTION OF THE INVENTION

In accordance with this invention, a connector is provided between a flexible tube and a container. The connector of this invention includes inner and outer tapered, telescoping sleeve members. One of the sleeve members carries a flange adapted for sealing about an aperture in the container. A flexible tubing segment is provided, with one end of the tubing segment being positioned in telescoping relation about the inner sleeve member, with the inner member occupying the bore of the flexible tube. The same end of the tubing segment is also positioned within the bore of the outer, tapered telescoping sleeve member, with the tubing segment being firmly retained by compression between the telescoping, tapered sleeve members.

The direction of tapering of the sleeve members is away from the flange: i.e., the smaller end of the tapered telescoping sleeve members point away from the flange.

The flange, and typically all of the inner and outer tapered telescoping sleeve members, comprises a material which is sealingly compatible with the container, for example, a polyolefin type material which is preferably sealingly compatible with a polyolefin container.

The flange specified above may be sealed about an aperture defined in the container. The tubing segment fits as specified above between the tapered telescoping sleeve members for retention therein. The tubing segment may define a different material which is not necessarily compatible for heat sealing with the container or the telescoping sleeve members, but is sealingly compatible with the material from which the desired flexible tube for connection is made.

Accordingly, the outer end of the tubing segment, retained by the pair of telescoping flanges, may be sealed in telescoping manner to the tubing which is desired for connection to the container. The result of this is to provide a strong, sealed connection between the tubing and container even when they are of dissimilar and sealingly incompatible materials.

For example, the container may be a blood bag made of a polyolefin material similar to those described in the patent cited above, while the tubing may, for example, be a polyvinyl chloride formulation. The tapering connection provides a strong seal, preventing pulling out under normal circumstances of the tubing segment from between the telescoping, tapered sleeve members.

As an added advantage of this invention, the connector may be assembled and heat or solvent sealed to the container about an aperture in the container. Thereafter, the outer end of the tubing segment may be solvent sealed, for example, to the tubing extension which is desired for connection to the system. This facilitates the initial manufacturing steps for making the container while avoiding the need to contend with a long tube dangling from the container in the process line. Then, as a last step, the long tubing can be attached by any conventional sealing means to the compatible material of the tubing extension.

In the drawings,

FIG. 1 is an enlarged, exploded view of a connector in accordance with this invention.

FIG. 2 is an elevational view of a blood bag in accordance with this invention, which carries the connector as defined herein.

FIG. 3 is a fragmentary, elevational view showing how a conventional blood bag donor tubing may be attached to the connector of this invention, which is, in turn, attached to the blood bag of FIG. 2.

FIG. 4 is a sectional view, taken along line 4—4 of FIG. 3.

Referring to the drawings, an example of the connector of this invention is shown for providing telescoping connection between flexible container 10, which may be a blood bag of known design, and a flexible tube 12, which may constitute a typical donor tube for a blood bag. The connector 14 of this invention comprises, as particularly shown in FIG. 1, an inner, tapered, telescoping sleeve 16, having a slightly tapered bore 17, and an outer, tapered telescoping sleeve 18, having a tapered bore 19.

Preferably, each tapered, telescoping sleeve 16, 18, carries flanges 19, 20. Flange 20 is adapted to seal at surface 21 about an aperture 22 of blood bag 10. Flange 19 may be sealed to flange 20 by a heat seal such as an ultrasonic seal, being preferably thinner than flange 20.

Flange 20, and also flange 19 and tapered sleeve members 16, 18 may be made out of a polyolefin material which is sealingly compatible with the material of blood bag 10. In the instance that the blood bag 10 is made of a polyolefin type material, members 16, 18 and 20 could be made of a polyolefin material as well, for example, polypropylene.

Flexible tubing segment 24 is positioned in telescoping relation about inner sleeve member 16, as shown in FIG. 4, with the inner sleeve member 16 occupying the bore 26 of tubing segment 24.

Tubing segment 24, in turn, is positioned with the outer, tapering telescoping sleeve member 18, in such a manner that the tubing segment 24 is retained by compression and constriction between the telescoping tapered sleeve members 16, 18.

The direction of tapering of the sleeve members from their large ends toward their narrow ends can be seen to be away from the flange 20. Bore 17 of inner sleeve 16 may taper only slightly, to facilitate mold core removal.

Annular recess 32 may be defined by the outer tapered sleeve member 18, in this present embodiment, to provide room for flowing material in tubing segment 24 to form an annular flange 33.

Annular flange 33 and annular recess 32 typically are not initially found in members 18, 24 in their original form, as shown in FIG. 1. However, during the ultrasonic sealing process in which outer sleeve 18 is firmly adhered to inner sleeve 16 by the adherence of flanges 19 and 20 together, a longitudinal pressure, generally parallel to the axis of the connector 14, may be exerted between the parts to cause a slight amount of collapse of sleeve 18. This can form annular recess 32, and correspondingly can cause the formation of annular flange 33 in tubing segment 24. The formation of annular flange 33 and recess 32 during the step of sealing the connector together in accordance with this invention provides a significant increase in the resistance of tubing segment 24 against pulling out of its connection between sleeve members 16, 18.

Tubing segment 24 also defines an opposite, outer end 34 which may be telescopically connected with and sealed to a tube extension, specifically donor tube 12. Tubing segment 24 may, for example, be made of a polyvinyl chloride-based formulation, to be compatible for solvent sealing with a vinyl donor tube 12.

Bag 10 may carry other known features of a blood bag, including a hanger member 36, and access ports 38 having removable closures in accordance with Winchell U.S. Pat. No. 4,111,324. Bag 10 as shown is a blow-molded container which may be made in accordance with Winchell, et al. U.S. Application Ser. No. 817,940, filed July 22, 1977, and entitled "FLEXIBLE COLLAPSIBLE CONTAINER AND METHOD OF MOLDING".

Accordingly, an expedited assembly technique for the container and attached tube of this invention may be accomplished by assembling the connector 14 of this invention in the manner described, followed by heat sealing flange 20 to aperture flange 40 of molded blood bag 10, by means of a heat sealing die 42 or by any other desired sealing means such as solvent sealing.

Following this, donor tube 12, carrying a conventional blood collection needle 44, may be solvent sealed or sealed by any other desired technique to the outer end 34 of tubing segment 24, with improved convenience since the earlier manufacturing operations may be performed without having the relatively long donor tubing dangling and getting in the way during the manufacturing operations.

The above has been offered for illustrative purposes only, and is not intended to limit the invention of this application, which is as defined in the claims below.

That which is claimed is:

1. A connector between a flexible tube and a container, which comprises: inner and outer telescoping sleeve members, tapered along essentially their entire lengths, each of said sleeve members carrying a flange adapted for sealing about an aperture in said container, said flanges being sealed together, a flexible tubing segment, one end of said tubing segment being positioned in telescoping relation about the inner sleeve member, with said inner member occupying the bore of said flexible tube, said end of the tubing segment being also positioned within the outer tapered telescoping sleeve member, said tubing segment being firmly retained by compression between said telescoping, tapered sleeve members, the direction of tapering of said sleeve members being away from said flanges, said flanges comprising a material which is sealingly compatible with said container, said tubing segment defining a different material from the material of said sleeve members and flanges, said tubing segment also defining an opposite outer end which is telescopically connected with and sealed to a tube extension made of a material which is sealingly compatible with said tubing segment.

* * * * *